(12) United States Patent
La et al.

(10) Patent No.: US 11,600,208 B2
(45) Date of Patent: Mar. 7, 2023

(54) DISPLAY DEVICE

(71) Applicant: Samsung Display Co., Ltd., Yongin-si (KR)

(72) Inventors: Sojeong La, Suwon-si (KR); Dongjin Park, Seongnam-si (KR); Jaiku Shin, Hwaseong-si (KR); Sung Chul Choi, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 8 days.

(21) Appl. No.: 17/228,045

(22) Filed: Apr. 12, 2021

(65) Prior Publication Data

US 2022/0044599 A1 Feb. 10, 2022

(30) Foreign Application Priority Data

Aug. 7, 2020 (KR) .......................... 10-2020-0099284

(51) Int. Cl.
  *G06F 1/16* (2006.01)
  *G09F 9/30* (2006.01)
(52) U.S. Cl.
  CPC ............ *G09F 9/301* (2013.01); *G06F 1/1616* (2013.01); *G06F 1/1643* (2013.01)
(58) Field of Classification Search
  CPC ...... G09F 9/301; G06F 1/1616; G06F 1/1643; G06F 1/1637; G06F 1/1641; G06F 1/1652; G06F 2203/04102; G06F 2200/1635; B32B 7/12
  See application file for complete search history.

(56) References Cited

U.S. PATENT DOCUMENTS

| | | | |
|---|---|---|---|
| 10,727,425 B2 | 7/2020 | Kim | |
| 2019/0334114 A1* | 10/2019 | Park | G06F 1/1652 |
| 2020/0133344 A1 | 4/2020 | Park et al. | |
| 2020/0134278 A1* | 4/2020 | Lee | G06F 1/203 |
| 2021/0382367 A1 | 12/2021 | Hashimoto | G06F 3/046 |
| 2021/0407344 A1* | 12/2021 | Lee | H01L 27/3262 |

FOREIGN PATENT DOCUMENTS

| | | |
|---|---|---|
| KR | 10-2019-0021738 | 3/2019 |
| KR | 10-2012444 | 8/2019 |
| KR | 10-2019-0124844 | 11/2019 |
| KR | 10-2020-0047885 | 5/2020 |

* cited by examiner

*Primary Examiner* — Rockshana D Chowdhury
(74) *Attorney, Agent, or Firm* — Kile Park Reed & Houtteman PLLC

(57) ABSTRACT

A display device includes a display module including a first non-folding area, a second non-folding area, and a folding area disposed between the first and second non-folding areas, a first support plate disposed beneath the display module and including openings to overlap the folding area in a plan view, a second support plate disposed beneath the first support plate and including first and second sub-support plates respectively overlapping the first and second non-folding areas in a plan view, and a digitizer module disposed between the first support plate and the second support plate.

18 Claims, 12 Drawing Sheets

DISPLAY DEVICE

CROSS-REFERENCE TO RELATED APPLICATION(S)

This application claims priority to and benefit of Korean Patent Application No. 10-2020-0099284, filed on Aug. 7, 2020, the entire contents of which is incorporated herein by reference.

BACKGROUND

1. Field of the Invention

The disclosure relates to a display device. The disclosure relates to a display device capable of preventing a digitizer module overlapping a folding area from being damaged.

2. Description of the Related Art

Electronic devices that provide an image to a user, such as a smartphone, a digital camera, a notebook computer, a navigation unit, and a smart television, include a display device to display the image. The display device generates the image and provides the image to the user through a display screen thereof.

In recent years, with the technological development of the display device, various types of display devices have been developed. For example, various flexible display devices, which are capable of being transformed into a curved shape, foldable, or rollable, are being developed. The flexible display devices are easy to carry and improves a user's convenience.

Among the flexible display devices, a foldable display device is folded about a folding axis. However, when the foldable display device is folded, damage to various elements are likely to occur in a folding area that is changed from a flat state to a curved shape.

Such a display apparatus may include, as a driving circuit, a thin-film transistor (TFT), a capacitor, etc. The thin-film transistor may include an active layer including a channel area, a source area, and a drain area, and a gate electrode electrically insulated from the active layer by a gate insulating layer. In general, the active layer of the thin-film transistor may include amorphous silicon or polysilicon.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device capable of preventing a digitizer module overlapping a folding area from being damaged.

Embodiments provide a display device that may include a display module including a first non-folding area, a second non-folding area, and a folding area disposed between the first non-folding area and the second non-folding area, a first support plate disposed beneath the display module and including openings to overlap the folding area in a plan view, a second support plate disposed beneath the first support plate and including a first sub-support plate and a second sub-support plate respectively overlapping the first non-folding area and the second non-folding area in a plan view, and a digitizer module disposed between the first support plate and the second support plate. The digitizer module may include a base substrate, an upper substrate, a lower substrate, first electrodes, second electrodes, a first insulating layer, and a second insulating layer.

The display device may further include a first adhesive layer disposed between the display module and the first support plate. The first adhesive layer may not overlap the folding area in a plan view.

The display device may further include a second adhesive layer disposed between the first support plate and the digitizer module. The second adhesive layer may not overlap the folding area in a plan view.

The display device may further include a third adhesive layer disposed between the digitizer module and the second support plate. The third adhesive layer may not overlap the folding area in a plan view. The first non-folding area, the folding area, and the second non-folding area may be arranged in a first direction, and a first length in the first direction of a space in which the second adhesive layer is not disposed may be the same as a second length in the first direction of a space in which the third adhesive layer is not disposed. The first sub-support plate and the second sub-support plate may be spaced apart from each other beneath the folding area, and a distance between the first sub-support plate and the second sub-support plate may be smaller than the first length and may be smaller than the second length. Each of the first length and the second length may be in a range from about 80 mm to about 130 mm. The openings may extend in a second direction intersecting the first direction. The first non-folding area, the folding area, and the second non-folding area may be arranged in a first direction, and a first length in the first direction of a space in which the second adhesive layer is not disposed may be different from a second a length in the first direction of a space in which the third adhesive layer is not disposed. The first support plate may have a thickness greater than a thickness of the second support plate.

The display device may further include a first cushion layer disposed between the digitizer module and the first support plate and overlapping the folding area in a plan view.

The display device may further include a second cushion layer disposed between the digitizer module and the second support plate and overlapping the folding area in a plan view. The second cushion layer may comprise a first sub-cushion layer disposed between the digitizer module and the first sub-support plate; and a second sub-cushion layer disposed between the digitizer module and the second sub-support plate.

According to an embodiment, a display device may include a display module; a first support plate disposed beneath the display module and including openings; a second support plate disposed beneath the first support plate and comprising a first sub-support plate and a second sub-support plate spaced apart from the first sub-support plate in an area overlapping the openings in a plan view; and a digitizer module disposed between the first sub-support plate and the second sub-support plate.

The display device may further include a first adhesive layer that is disposed between the display module and the first support plate and does not overlap a folding area of the display module, the folding area overlapping the openings in a plan view; a second adhesive layer that is disposed between the first support plate and the digitizer module and does not overlap the folding area in a plan view; and a third adhesive layer that is disposed between the digitizer module and the second support plate and does not overlap the folding area in a plan view.

display device may further include a first cushion layer disposed between the digitizer module and the first support plate and overlapping the folding area in a plan view; and a second cushion layer disposed between the digitizer module and the second support plate and overlapping the folding area in a plan view.

In the embodiments, sub-adhesive layers of each of the adhesive layers disposed on and beneath the digitizer module may be disposed to be spaced apart from a folding axis. When the sub-adhesive layers of the adhesive layer are disposed to be spaced apart with a distance from about 80 mm to about 130 mm, the strain of the digitizer module decreases. As the strain of the digitizer module decreases, cracks are reduced even though the display device is repeatedly folded.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1:
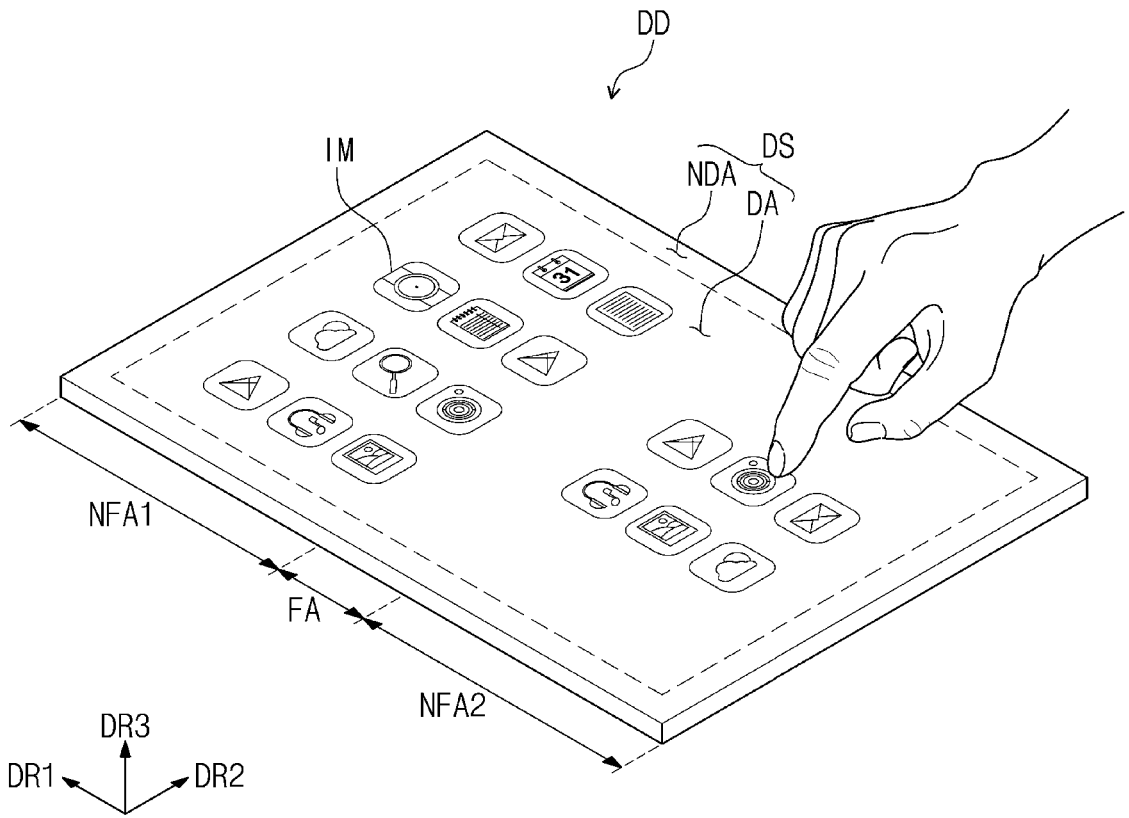
FIG. 1 is a schematic perspective view showing a display device according to an embodiment of the disclosure.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

In the disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items. In the specification and the claims, the term "and/or" is intended to include any combination of the terms "and" and "or" for the purposes of its meaning and interpretation. For example, "A and/or B" may be understood to mean "A, B or A and B." The terms "and" and "or" may be used in conjunctive or disjunctive sense and may be understood to be equivalent to "and/or."

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In this specification, it will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

Hereinafter, embodiments of the disclosure and items required for those skilled in the art to easily understand the content of the disclosure will be described in detail with reference to the accompanying drawings. In the following description, singular forms in the disclosure are intended to include the plural forms as well, unless the context clearly indicates otherwise.

The term "overlap" may include layer, stack, face or facing, extending over, extending under, covering or partly covering or any other suitable term as would be appreciated and understood by those of ordinary skill in the art. The phrase "not overlap" may include apart from or set aside from or offset from and any other suitable equivalents as would be appreciated and understood by those of ordinary skill in the art.

Terms such as "about", "approximately", and "substantially" as used herein are inclusive of the stated value and mean within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within, for example, ±30%, 20%, or 5% of the stated value.

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, the disclosure will be explained in detail with reference to the accompanying drawings.

FIG. 1 is a perspective view showing a display device DD according to an embodiment of the disclosure.

Referring to FIG. 1, the display device DD according to the embodiment of the disclosure may have a rectangular shape defined by long sides extending in a first direction DR1 and short sides extending in a second direction DR2 crossing the first direction DR1. However, the shape of the display device DD should not be limited to the rectangular shape, and the display device DD may have various shapes, such as a circular shape and a polygonal shape. The display device DD may be a flexible display device.

Hereinafter, a direction substantially perpendicular to a surface defined by the first direction DR1 and the second direction DR2 may be referred to as a "third direction DR3". In the disclosure, the expression "in a plan view" may mean a state of being viewed in the third direction DR3.

The display device DD may include a folding area and non-folding areas. The non-folding areas may include a first non-folding area NFA1 and a second non-folding area NFA2. The folding area FA may be disposed between the first non-folding area NFA1 and the second non-folding area NFA2. The second non-folding area NFA2, the folding area FA, and the first non-folding area NFA1 may be arranged in the first direction DR1.

In the embodiment, one folding area FA and two non-folding areas NFA1 and NFA2 are shown as a representative example, however, the number of the folding areas FA and the number of non-folding areas NFA1 and NFA2 should not be limited thereto or thereby. For example, the display device DD may include more than two non-folding areas and folding areas disposed between the non-folding areas.

An upper surface of the display device DD may be referred to as a "display surface DS" and may be a plane surface defined by the first direction DR1 and the second direction DR2. Images IM generated by the display device DD may be provided to a user through the display surface DS.

The display surface DS may include a display area DA and a non-display area NDA around the display area DA. The display area DA displays the image IM, and the non-display area NDA does not display the image IM. The non-display area NDA surrounds the display area DA and defines an edge of the display device DD, which may be printed by a predetermined color.

Figure 2:
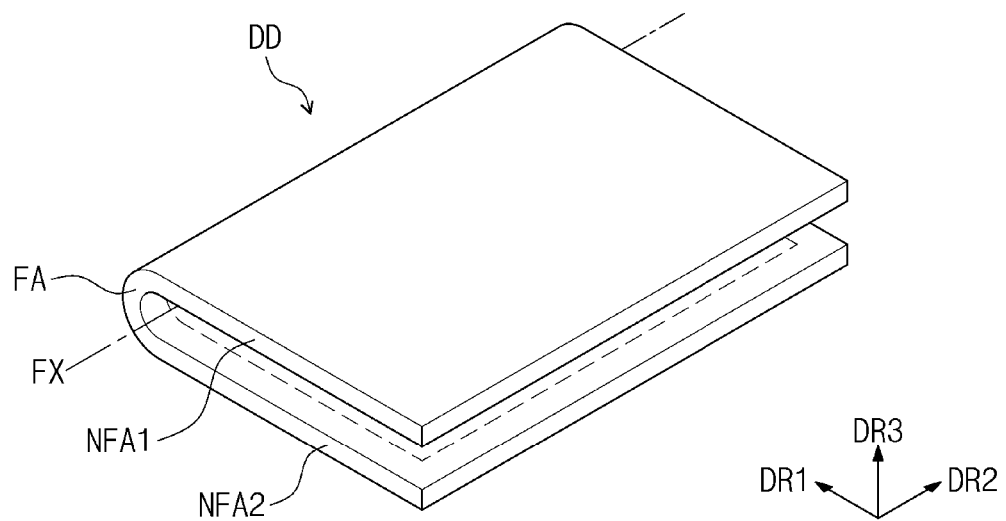
FIG. 2 is a schematic perspective view showing a folded state of the display device shown in FIG. 1.

FIG. 2 is a perspective view showing a folded state of the display device DD shown in FIG. 1.

Referring to FIG. 2, the display device DD may be, but not limited to, a foldable display device DD that is folded or unfolded. For example, the folding area FA may be folded about a folding axis FX substantially parallel to the second direction DR2, and thus, the display device DD may be folded. The folding axis FX may be defined as a short axis substantially parallel to the short sides of the display device DD.

When the display device DD is folded, the first non-folding area NFA1 and the second non-folding area NFA2 face each other, and thus, the display device DD may be inwardly folded (in-folding) such that the display surface DS is not exposed to the outside.

Figure 3:
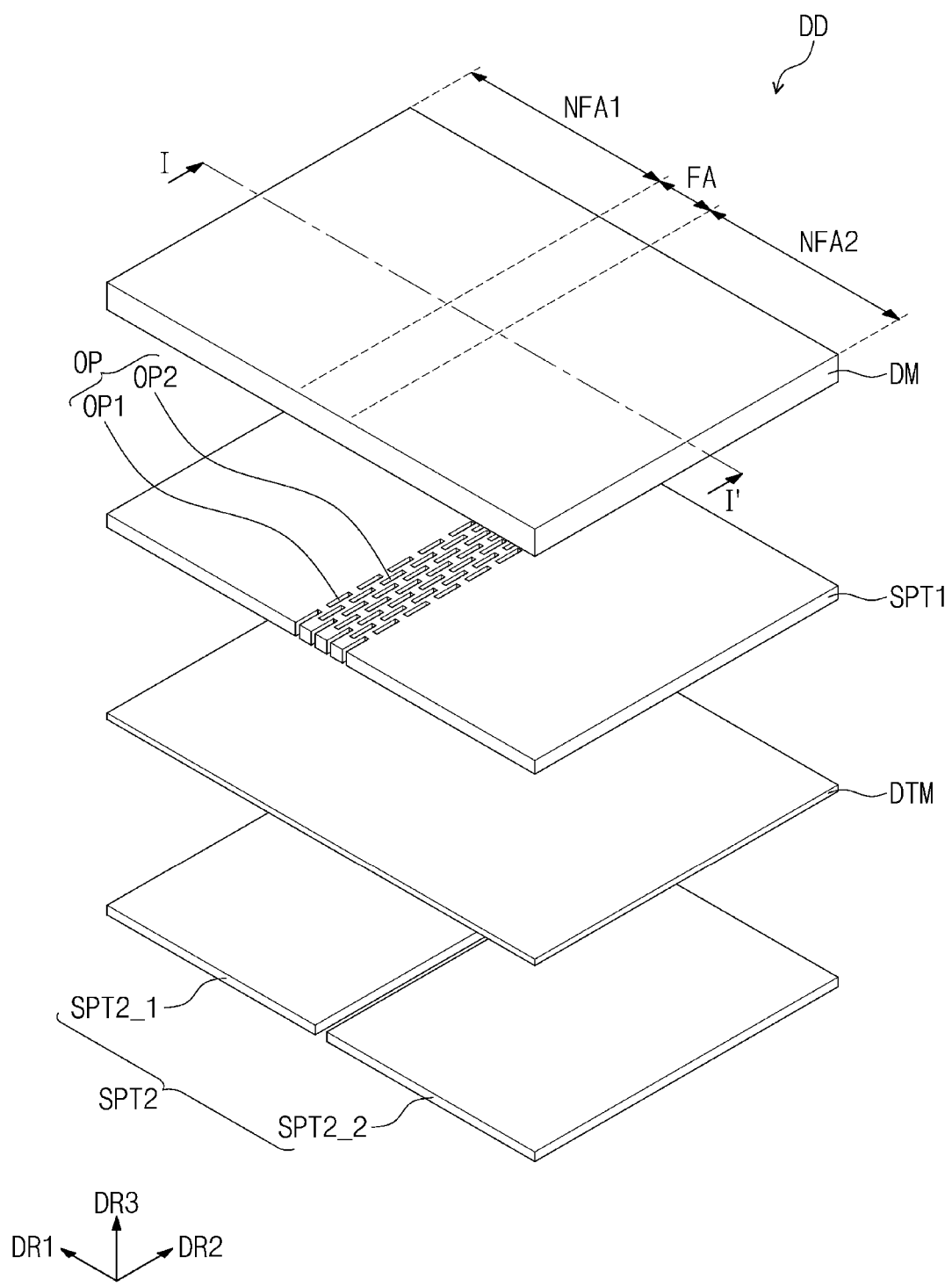
FIG. 3 is an exploded perspective view showing the display device shown in FIG. 1.

FIG. 3 is an exploded perspective view showing the display device DD shown in FIG. 1.

Referring to FIG. 3, the display device DD may include a display module DM, a first support plate SPT1 disposed beneath the display module DM, a digitizer module DTM disposed beneath the first support plate SPT1, and a second support plate SPT2 disposed beneath the digitizer module DTM.

The display module DM may include the first and second non-folding areas NFA1 and NFA2 and the folding area FA as the display device DD. Positions of the first and second non-folding areas NFA1 and NFA2 and the folding area FA are the same as those described with reference to FIGS. 1 and 2, and thus, detailed descriptions thereof will be omitted.

The digitizer module DTM may be disposed between the first support plate SPT1 and the second support plate SPT2. The digitizer module DTM may have a rectangular shape with long sides in the first direction DR1 and short sides in the second direction DR2.

The first and second support plates SPT1 and SPT2 may support the display module DM and the digitizer module DTM. The first support plate SPT1 may be disposed between the display module DM and the digitizer module DTM. The first support plate SPT1 may include a metal material such as a stainless steel. For example, the first support plate SPT1 may include SUS 304, however, it should not be limited thereto or thereby. The first support plate SPT1 may include a variety of metal materials.

The second support plate SPT2 may include a first sub-support plate SPT2_1 and a second sub-support plate SPT2_2. The first and second sub-support plates SPT2_1 and SPT2_2 may be arranged in the first direction DR1. The second support plate SPT2 may include a metal material such as a stainless steel. For example, the second support plate SPT2 may include SUS 304, however, it should not be limited thereto or thereby. The second support plate SPT2 may include a variety of metal materials.

The first support plate SPT1 may be provided with openings OP defined therethrough. In a plan view, the openings OP may overlap the folding area FA. The openings OP may be defined by removing portions of the first support plate SPT1. The openings OP may extend in the second direction DR2. The openings OP may be arranged in the first direction DR1 and the second direction DR2.

The openings OP may include first openings OP1 arranged in the first direction DR1 and the second direction DR2 and second openings OP2 arranged in the first direction DR1 and the second direction DR2. The second openings OP2 may be disposed between the first openings OP1 in the first direction DR1. The second openings OP2 may be alternately arranged with the first openings OP1.

The second support plate SPT2 may include the first sub-support plate SPT2_1 disposed beneath the first non-folding area NFA1 and the second sub-support plate SPT2_2 disposed beneath the second non-folding area NFA2. Accordingly, the first sub-support plate SPT2_1 may overlap the first non-folding area NFA1 in a plan view. The second sub-support plate SPT2_2 may overlap the second non-folding area NFA2 in a plan view.

Although not shown in figures, adhesives may be disposed between the display module DM and the first support plate SPT1, between the first support plate SPT1 and the digitizer module DTM, and between the digitizer module DTM and the second support plate SPT2. The display module DM, the first support plate SPT1, the digitizer module DTM, and the second support plate SPT2 may be attached to each other by the adhesives. The adhesives will be described in detail below with reference to FIG. 4.

Figure 4:
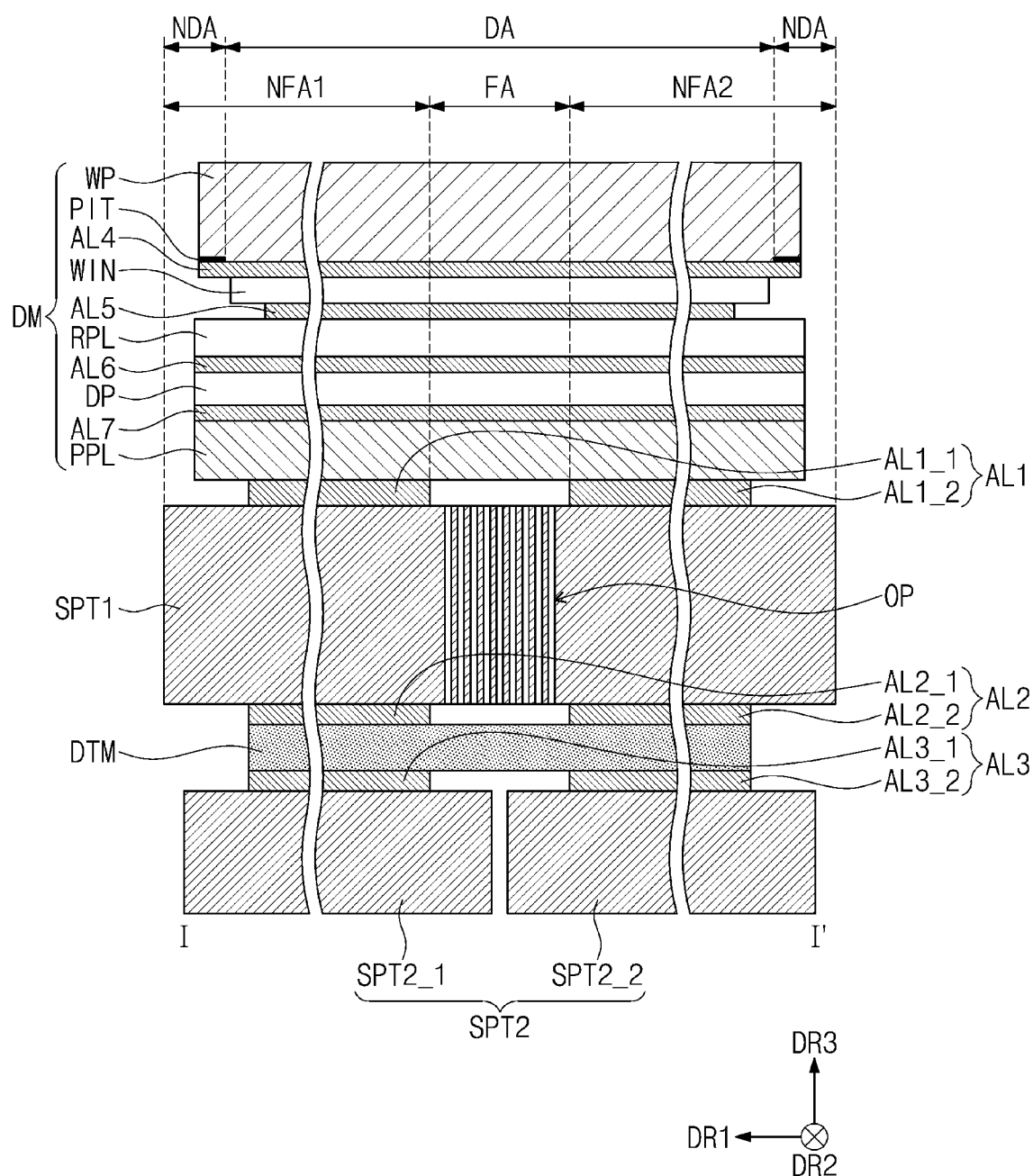
FIG. 4 is a cross-sectional view taken along line I-I' shown in FIG. 3.

FIG. 4 is a cross-sectional view taken along line I-I' shown in FIG. 3.

Referring to FIG. 4, the first support plate SPT1 may be disposed beneath the display module DM and may support the display module DM. In a plan view, a portion of the first support plate SPT1 may be easily changed in shape by the openings OP overlapping the folding area FA. When the display device DD is folded, the portion of the first support plate SPT1, which overlaps the folding area FA, may be easily changed in shape, and thus, the folding area FA may be easily folded.

The digitizer module DTM disposed beneath the first support plate SPT1 may be implemented in a pressure sensing method. The digitizer module DTM may sense a pressure applied to the display device DD.

When the pressure is applied to the display device DD by a user with a digitizer pen (not shown), the digitizer module DTM may sense the pressure caused by the digitizer pen. The digitizer module DTM may implement an input corresponding to the sensed pressure. The display device DD may implement an output corresponding to the input. For example, the user may draw something on the display device DD using the digitizer pen.

The second support plate SPT2 may support the display module DM together with the first support plate SPT1. The second support plate SPT2 may support the digitizer module DTM.

The first sub-support plate SPT2_1 and the second sub-support plate SPT2_2 of the second support plate SPT2 may extend beneath the folding area FA to be disposed adjacent to each other in the folding area FA. The first sub-support plate SPT2_1 and the second sub-support plate SPT2_2 may overlap the folding area FA. The first support plate SPT1 may have a thickness greater than a thickness of the second support plate SPT2 in the third direction DR3 or in an upward direction.

A first adhesive layer AL1 may be disposed between the display module DM and the first support plate SPT1. In a plan view, the first adhesive layer AL1 may not overlap the folding area FA. In a plan view, the first adhesive layer AL1 may include a first sub-adhesive layer AL1_1 overlapping the first non-folding area NFA1 and a second sub-adhesive layer AL1_2 overlapping the second non-folding area NFA2. The display module DM and the first support plate SPT1 may be attached to each other by the first adhesive layer AL1.

A second adhesive layer AL2 may be disposed between the first support plate SPT1 and the digitizer module DTM. In a plan view, the second adhesive layer AL2 may not overlap the folding area FA. In a plan view, the second adhesive layer AL2 may include a third sub-adhesive layer AL2_1 overlapping the first non-folding area NFA1 and a fourth sub-adhesive layer AL2_2 overlapping the second non-folding area NFA2. The first support plate SPT1 and the digitizer module DTM may be attached to each other by the second adhesive layer AL2.

A third adhesive layer AL3 may be disposed between the digitizer module DTM and the second support plate SPT2. In a plan view, the third adhesive layer AL3 may not overlap the folding area FA. In a plan view, the third adhesive layer AL3 may include a fifth sub-adhesive layer AL3_1 overlapping the first non-folding area NFA1 and a sixth sub-adhesive layer AL3_2 overlapping the second non-folding area NFA2. The digitizer module DTM and the second support plate SPT2 may be attached to each other by the third adhesive layer AL3.

The display module DM may include a display panel DP, an anti-reflective layer RPL, a window WIN, a window protective layer WP, a panel protective layer PPL, and a printed layer PIT.

The display panel DP may be a light-emitting type display panel, however, it should not be particularly limited. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot and a quantum rod. Hereinafter, the organic light emitting display panel will be described as a representative example of the display panel DP.

The display panel DP may be a flexible display panel. Similar to the display module DM, the display panel DP may include a second non-folding area NFA2, a folding area FA, and a first non-folding area NFA1, which are arranged in the first direction DR1. The display panel DP may include a plurality of pixels to display an image IM. The pixels may include organic light emitting elements.

The anti-reflective layer RPL may be disposed on the display panel DP. The anti-reflective layer RPL may be disposed to contact (e.g., directly contact) the display panel DP. However, it should not be limited thereto or thereby, and the anti-reflective layer RPL may be attached to the display panel DP by an adhesive after being manufactured as a separate panel.

When an external light traveling to the display panel DP is provided to the user after being reflected by the display panel DP, the user may perceive the external light.

As an example, the anti-reflective layer RPL may include color filters that displays the same colors as those of the pixels to prevent the above-mentioned phenomenon. The color filters may filter the external light with the same colors as those of the pixels. The external light may not be perceived by the user. However, it should not be limited thereto or thereby, and the anti-reflective layer RPL may include a retarder and/or a polarizer to reduce a reflectance of the external light.

The window WIN may be disposed on the anti-reflective layer RPL. The window WIN may protect the display panel DP and the anti-reflective layer RPL from external scratches. The window WIN may have an optically transparent property. The window WIN may include glass. The window WIN may include ultra-thin glass (UTG). However, the window WIN should not be limited thereto or thereby, and the window WIN may include a synthetic resin film.

The window protective layer WP may be disposed on the window WIN. The window protective layer WP may protect the window WIN. The window protective layer WP may include a flexible plastic material, such as polyimide (PI) or polyethylene terephthalate (PET). Although not shown in figures, a hard coating layer may be further disposed on the window protective layer WP. An anti-fingerprint layer or a shatter-proof layer may be further disposed on the window protective layer WP as a functional layer.

The panel protective layer PPL may be disposed beneath the display panel DP. The panel protective layer PPL may protect a lower portion of the display panel DP. The panel protective layer PPL may include a flexible plastic material. For example, the panel protective layer PPL may include polyethylene terephthalate (PET).

The display device DD may include fourth, fifth, sixth, and seventh adhesive layers AL4, AL5, AL6, and AL7. The fourth adhesive layer AL4 may be disposed between the window protective layer WP and the window WIN. The fifth adhesive layer AL5 may be disposed between the window WIN and the anti-reflective layer RPL. The sixth adhesive layer AL6 may be disposed between the anti-reflective layer RPL and the display panel DP. The seventh adhesive layer AL7 may be disposed between the display panel DP and the panel protective layer PPL.

The first to seventh adhesive layers AL1 to AL7 may include a pressure sensitive adhesive (PSA) or an optically clear adhesive (OCA).

The window protective layer WP and the window WIN may be attached to each other by the fourth adhesive layer AL4. The window WIN and the anti-reflective layer RPL may be attached to each other by the fifth adhesive layer AL5. The anti-reflective layer RPL and the display panel DP may be attached to each other by the sixth adhesive layer AL6. The display panel DP and the panel protective layer PPL may be attached to each other by the seventh adhesive layer AL7.

The printed layer PIT may be attached to a lower surface of the window protective layer WP. The printed layer PIT may overlap the non-display area NDA in a plan view. The first adhesive layer AL1 may be disposed beneath the window protective layer WP to cover the printed layer PIT. For example, the printed layer PIT may include a black color, however, it should not be limited thereto or thereby. For example, the printed layer PIT may include a variety of colors.

The window protective layer WP may have a width greater than a width of the window WIN in the first direction DR1 and the second direction DR2. Each of the display panel DP, the anti-reflective layer RPL, and the panel protective layer PPL may have a width greater than the width of the window WIN in the first direction DR1 and the second direction DR2.

The display panel DP, the anti-reflective layer RPL, and the panel protective layer PPL may have the same width as each other in the first direction DR1 and the second direction DR2. In the first direction DR1 and the second direction DR2, the fourth adhesive layer AL4 may have the same width as that of the window protective layer WP, and the fifth adhesive layer AL5 may have the same width as that of the window WIN.

Figure 5:
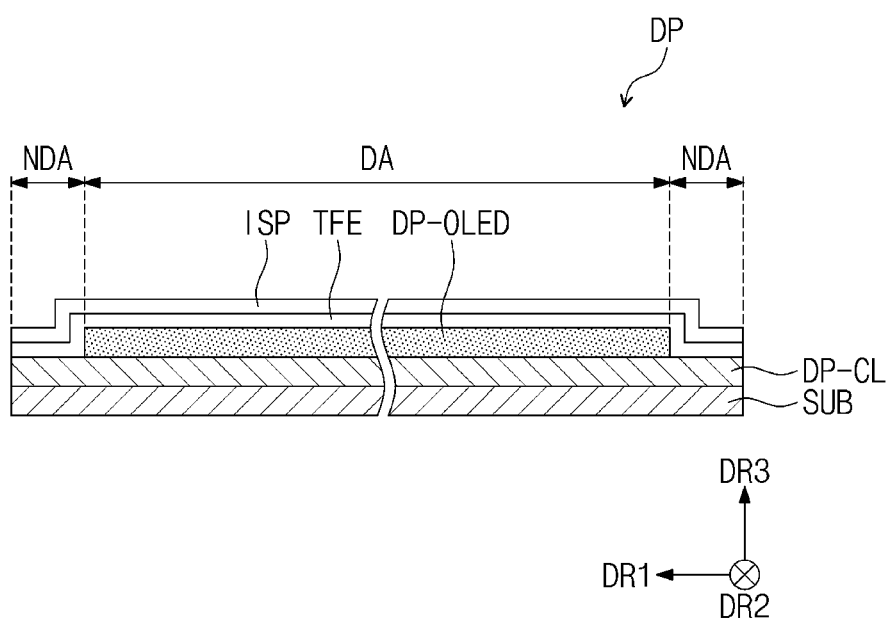
FIG. 5 is a cross-sectional view showing a display panel shown in FIG. 4.

FIG. 5 is a cross-sectional view showing the display panel DP shown in FIG. 4. As an example, FIG. 5 shows a cross-section of the display panel DP when viewed in the second direction DR2.

Referring to FIG. 5, the display panel DP may include a substrate SUB, a circuit element layer DP-CL disposed on the substrate SUB, a display element layer DP-OLED disposed on the circuit element layer DP-CL, a thin film encapsulation layer TFE disposed on the display element layer DP-OLED, and an input sensing unit ISP disposed on the thin film encapsulation layer TFE. The display element layer DP-OLED may be disposed in the display area DA.

The substrate SUB may include the display area DA and the non-display area NDA around the display area DA. The substrate SUB may include a flexible plastic material. For example, the substrate SUB may include polyimide (PI).

The circuit element layer DP-CL may include an insulating layer, a semiconductor pattern, a conductive pattern, and a signal line. An insulating layer, a semiconductor layer, and a conductive layer may be formed on the substrate SUB by a coating or depositing process. The insulating layer, the semiconductor layer, and the conductive layer may be selectively patterned through several photolithography processes, and thus, the semiconductor pattern, the conductive pattern, and the signal line may be formed.

The circuit element layer DP-CL may include transistors including the semiconductive pattern, the conductive pattern, and the signal line. The display element layer DP-OLED may include light emitting elements connected to the transistors. The pixels PX (see FIG. 6) may include the transistors and the light emitting elements.

The thin film encapsulation layer TFE may be disposed on the circuit element layer DP-CL to cover the display element layer DP-OLED. The thin film encapsulation layer TFE may include an inorganic layer, an organic layer, and an inorganic layer, which are sequentially stacked to each other. The inorganic layers may include an inorganic material and may protect the pixels PX from moisture and oxygen. The organic layer may include an organic material and may protect the pixels PX from a foreign substance, such as dust particles.

The input sensing unit ISP may include sensors (not shown) to sense the external input. The sensors may sense the external input using a capacitive method. The external input may include various inputs, such as a user's body part, light, heat, pen, or pressure.

The input sensing unit ISP may be manufactured directly on the thin film encapsulation layer TFE when the display panel DP is manufactured. However, it should not be limited thereto or thereby, and the input sensing unit ISP may be attached to the display panel DP by an adhesive layer after being separately manufactured from the display panel DP.

Figure 6:
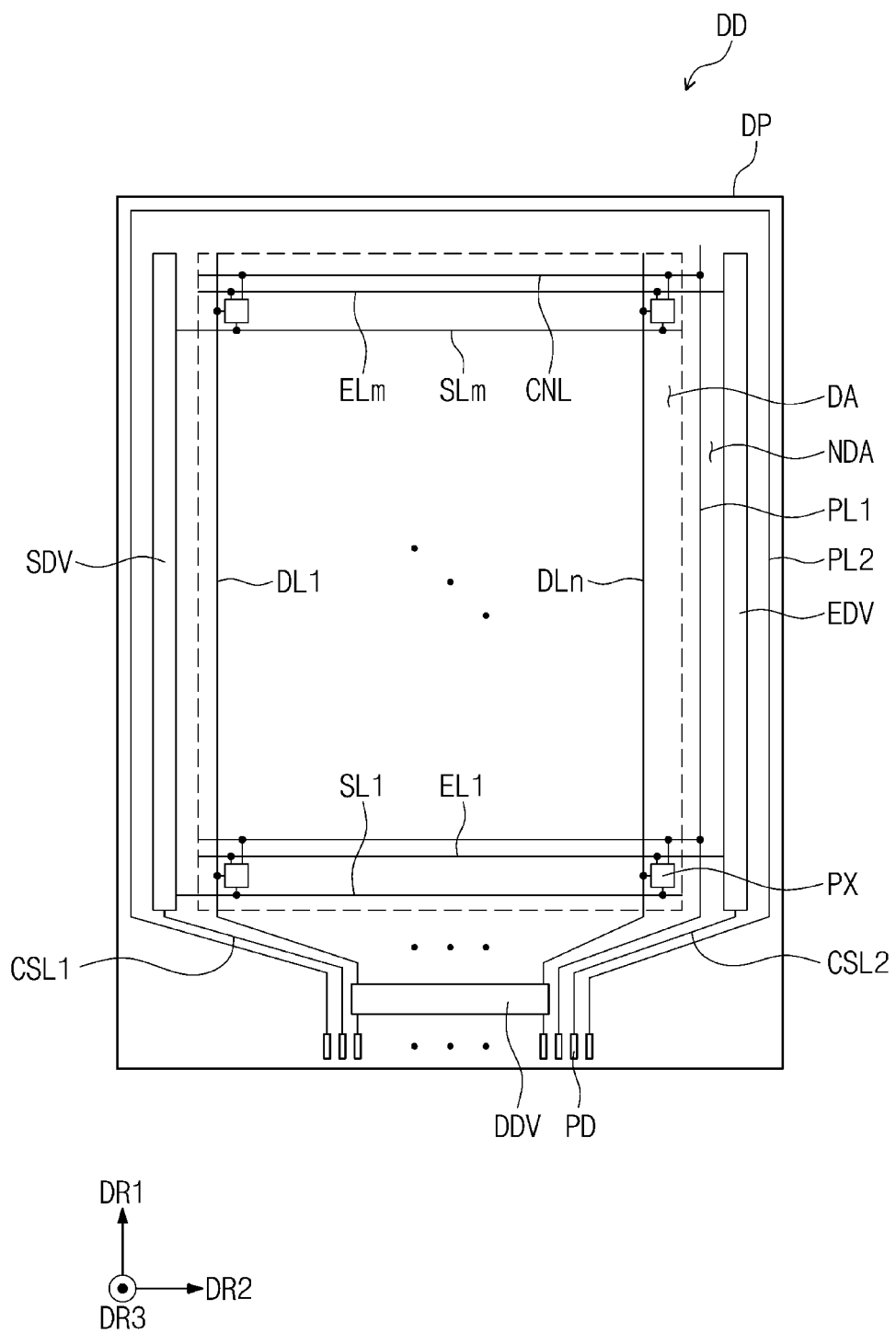
FIG. 6 is a plan view showing the display panel shown in FIG. 5.

FIG. 6 is a plan view showing the display panel DP shown in FIG. 5.

Referring to FIG. 6, the display device DD may include the display panel DP, a scan driver SDV, a data driver DDV, an emission driver EDV, and pads PD. Although not shown in figures, the display device DD may further include a separate driver to drive the input sensing unit ISP disposed on the display panel DP.

The display panel DP may have a rectangular shape having long sides extending in the first direction DR1 and short sides extending in the second direction DR2, however, the shape of the display panel DP should not be limited thereto or thereby. The display panel DP may include the display area DA and the non-display area NDA surrounding the display area DA.

The display panel DP may include a plurality of pixels PX, scan lines SL1 to SLm, data lines DL1 to DLn, emission lines EL1 to Elm, first and second control lines CSL1 and CSL2, first and second power lines PL1 and PL2, respectively, and connection lines CNL. Each of "m" and "n" is a natural number.

The pixels PX may be arranged in the display area DA. The scan driver SDV and the emission driver EDV may be disposed to be respectively adjacent to the long sides of the display panel DP. The data driver DDV may be disposed to be adjacent to one short side of the short sides of the display panel DP. In a plan view, the data driver DDV may be disposed to be adjacent to a lower end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The emission lines EL1 to ELm may extend in the second direction DR2 and may be connected to the pixels PX and the emission driver EDV.

The first power line PL1 may extend in the first direction DR1 and may be disposed in the non-display area NDA. The first power line PL1 may be disposed between the display area DA and the emission driver EDV, however, it should not be limited thereto or thereby. For example, the first power line PL1 may be disposed between the display area DA and the scan driver SDV.

The connection lines CNL may extend in the second direction DR2 and may be arranged in the first direction DR1. The connection lines CNL may be connected to the first power line PL1 and the pixels PX. A first voltage may be applied to the pixels PX through the first power line PL1 and the connection lines CNL connected to the first power line PL1.

The second power line PL2 may be disposed in the non-display area NDA. The second power line PL2 may extend along the long sides of the display panel DP and a short side at which the data driver DDV is not disposed in the display panel DP. The second power line PL2 may be disposed outside the scan driver SDV and the emission driver EDV.

Although not shown in figures, the second power line PL2 may extend to the display area DA and may be connected to the pixels PX. A second voltage having a level lower than that of the first voltage may be applied to the pixels PX through the second power line PL2.

The first control line CSL1 may be connected to the scan driver SDV and may extend toward a lower end of the display panel DP in a plan view. The second control line CSL2 may be connected to the emission driver EDV and may extend toward the lower end of the display panel DP in a plan view. The data driver DDV may be disposed between the first control line CSL1 and the second control line CSL2.

The pads PD may be disposed on the display panel DP. The pads PD may be disposed closer to the lower end of the display panel DP than the data driver DDV is. The data driver DDV, the first power line PL1, the second power line PL2, the first control line CSL1, and the second control line CSL2 may be connected to the pads PD. The data lines DL1 to DLn may be connected to the data driver DDV, and the data driver DDV may be connected to the pads PD corresponding to the data lines DL1 to DLn.

Although not shown in figures, the display device DD may further include a timing controller to control an operation of the scan driver SDV, the data driver DDV, and the emission driver EDV and a voltage generator to generate the first and second voltages. The timing controller and the voltage generator may be connected to corresponding pads PD through a printed circuit board.

The scan driver SDV may generate scan signals, and the scan signals may be applied to the pixels PX through the scan lines SL1 to SLm. The data driver DDV may generate data voltages, and the data voltages may be applied to the pixels PX through the data lines DL1 to DLn. The emission driver EDV may generate emission signals, and the emission signals may be applied to the pixels PX through the emission lines EL1 to ELm.

The pixels PX may receive the data voltages in response to the scan signals. The pixels PX may emit a light having a luminance corresponding to the data voltages in response to the emission signals, and thus, the image may be displayed. An emission time of the pixels PX may be controlled by the emission signals.

Figure 7:
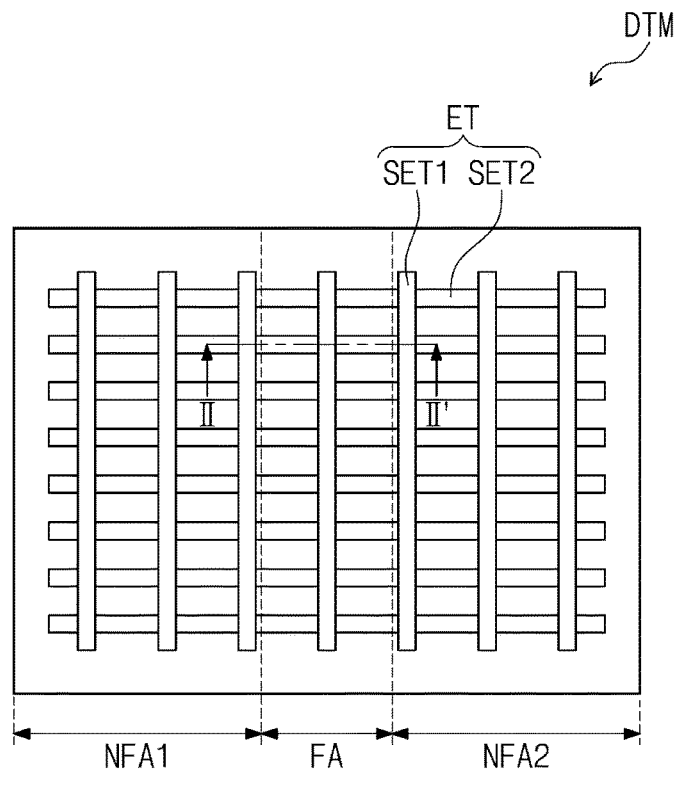
FIG. 7 is a plan view showing a digitizer module shown in FIG. 4.
Figure 7:
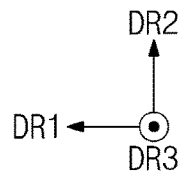
Figure 8:
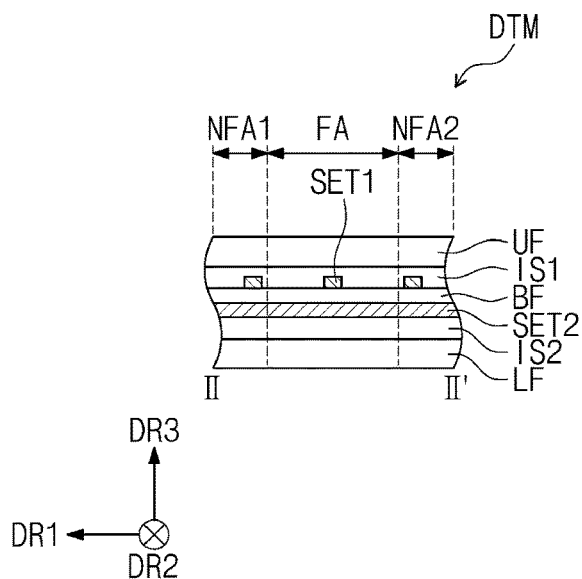
FIG. 8 is a cross-sectional view taken along line II-IF shown in FIG. 7.

FIG. 7 is a plan view showing the digitizer module shown in FIG. 4, and FIG. 8 is a cross-sectional view taken along line II-IF shown in FIG. 7.

Referring to FIG. 7, the digitizer module DTM may include electrodes ET insulated from each other while crossing each other. The electrodes ET may overlap the folding area FA and the first and second non-folding areas NFA1 and NFA2. The electrodes ET may include first electrodes SET1 and second electrodes SET2.

The first electrodes SET1 may extend in the second direction DR2 and may be arranged in the first direction DR1. The second electrodes SET2 may extend in the first direction DR1 and may be arranged in the second direction DR2. The first electrodes SET1 may be disposed on a layer different from a layer on which the second electrodes SET2 are disposed.

Referring to FIG. 8, the digitizer module DTM may include a base substrate BF, an upper substrate UF, a lower substrate LF, first electrodes SET1, second electrodes SET2, a first insulating layer IS1, and a second insulating layer IS2.

The base substrate BF, the upper substrate UF, and the lower substrate LF may include a flexible plastic substrate. For example, the base substrate BF, the upper substrate UF, and the lower substrate LF may include polyimide (PI).

The first and second electrodes SET1 and SET2 of the digitizer module DTM may include copper. However, they should not be limited thereto or thereby, and the first and second electrodes SET1 and SET2 may include another material.

The first electrodes SET1 may be disposed on the base substrate BF, and the second electrodes SET2 may be disposed beneath the base substrate BF.

The first insulating layer IS1 may be disposed on the base substrate BF to cover the first electrodes SET1. The second insulating layer IS2 may be disposed beneath the base substrate BF to cover the second electrodes SET2. The first and second insulating layers IS1 and IS2 may include an organic material and/or an inorganic material.

The upper substrate OF may be disposed on the first insulating layer IS1. The lower substrate LF may be disposed beneath the second insulating layer IS2.

Figure 9:
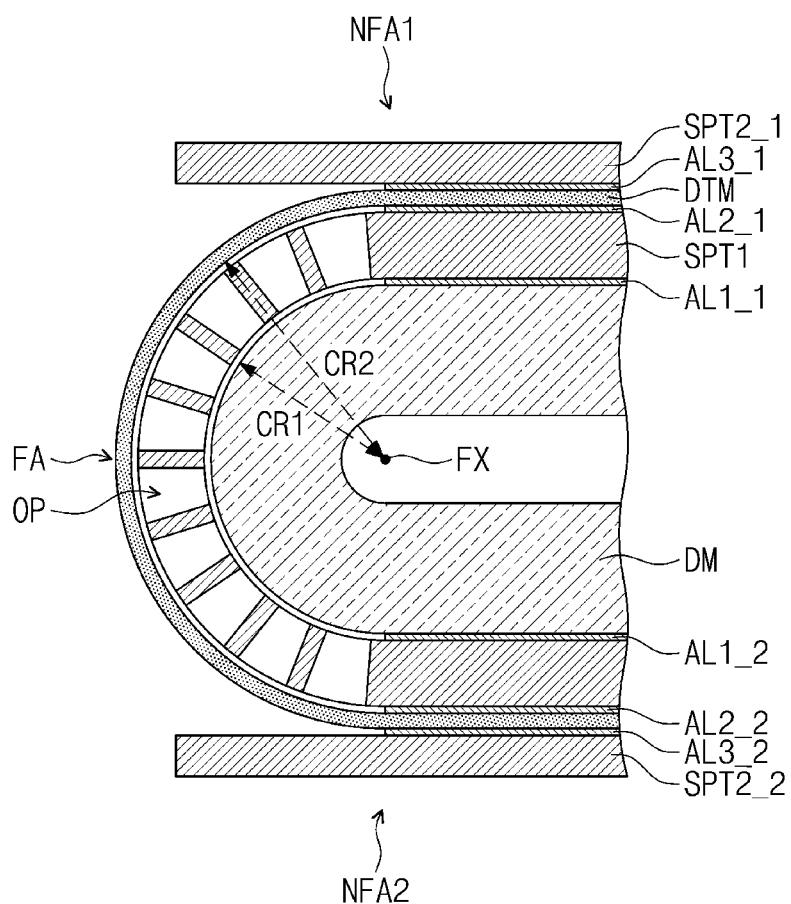
FIG. 9 is a view showing an in-folding state of the display device shown in FIG. 4.

FIG. 9 is a view showing an in-folding state of the display device shown in FIG. 4.

As an example, the display module DM is shown as a single layer in FIG. 9, and thus, components of the display module DM are not shown in FIG. 9.

Referring to FIG. 9, the display device DD may be inwardly folded (in-folding) about the folding axis FX. The folding area FA may be folded, and thus, the first non-folding area NFA1 and the second non-folding area NFA2 may face each other.

The first support plate SPT1 may be provided with the openings OP overlapping the folding area FA. Accordingly, when the display device DD is folded, the first support plate SPT1 overlapping the folding area FA may be easily folded by the openings OP.

The first non-folding area NFA1 overlapping the first sub-support plate SPT2_1 and the second non-folding area NFA2 overlapping the second sub-support plate SPT2_2 may be in a flat state.

The state of the display device DD may be changed to a second state in which the display device DD may be folded as shown in FIG. 9 from a first state in which the display device DD may be flat as shown in FIG. 4 or may be changed to the first state from the second state. This folding operation may be repeatedly performed.

Since the display module DM may be flexible, the folding area FA of the display module DM may be easily folded. However, the first and second sub-support plates SPT2_1 and SPT2_2 may be rigid, and thus, the first and second sub-support plates SPT2_1 and SPT2_2 may not be folded.

In a case where the fifth sub-adhesive layer AL3_1 and the sixth sub-adhesive layer AL3_2 are disposed even in the folding area FA, the first and second sub-support plates SPT2_1 and SPT2_2 may be attached to the digitizer module DTM in the folding area FA.

When the first and second sub-support plates SPT2_1 and SPT2_2 are attached to the digitizer module DTM in the folding area FA of the display module DM, the folding area FA may not be folded due to the first and second sub-support plates SPT2_1 and SPT2_2 that have the rigid property. Accordingly, the folding operation of the display module DM may be difficult.

In the embodiment of the disclosure, the third adhesive layer AL3 may not be disposed in the area that overlaps the folding area FA. Accordingly, portions of the first and second sub-support plates SPT2_1 and SPT2_2, which overlap the folding area FA, are not attached to the digitizer module DTM, and as a result, the folding area FA may be easily folded.

For the same reason, since the first and second adhesive layers AL1 and AL2 are not disposed in the area that overlaps the folding area FA, the first support plate SPT1 may not be attached to the folding area FA, and thus, the folding area FA may be easily folded.

Where the digitizer module DTM is disposed between the display module DM and the first support plate SPT1, the digitizer module DTM may be folded to have a first radius of curvature CR1 in the folding area FA. However, in the embodiment of the disclosure, the digitizer module DTM may be disposed between the first support plate SPT1 and the second support plate SPT2, and the digitizer module DTM may be folded to have a second radius of curvature CR2 in the folding area FA. The second radius of curvature CR2 may be greater than the first radius of curvature CR1. As the radius of curvature increases, a stress occurring in the folding area FA may decrease. As the stress increases, components of the digitizer module DTM, for example, the lines shown in FIG. 7, may be damaged.

In an embodiment of the disclosure, when the digitizer module DTM is folded to have the second radius of curvature CR2 in the folding area FA, the stress may decrease. As a result, the components of the digitizer module DTM may be prevented from being damaged.

Figure 10:
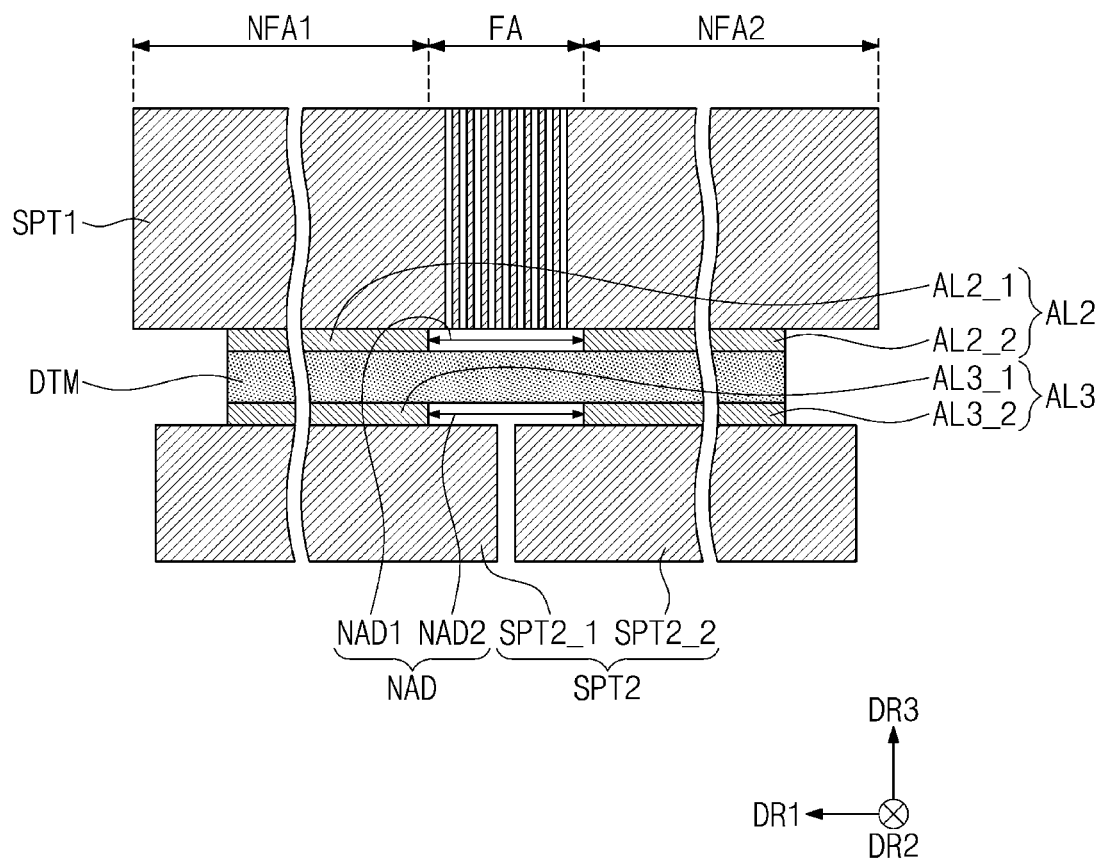
FIG. 10 is a view showing a separation distance defined by a distance in a space in which second and third adhesive layers shown in FIG. 4 are not disposed.

FIG. 10 is a view showing a separation distance defined by a distance in a space in which the second and third adhesive layers shown in FIG. 4 are not disposed;

As an example, FIG. 10 shows a cross-section corresponding to the cross-section of FIG. 4.

Referring to FIG. 10, the third and fourth sub-adhesive layers AL2_1 and AL2_2 of the second adhesive layer AL2 may not overlap the folding area FA. A first non-attached distance NAD1 may be defined in the second adhesive layer AL2. The first non-attached distance NAD1 may be defined as a length in the first direction DR1 of the space in which the second adhesive layer AL2 is not disposed. For example, the first non-attached distance NAD1 may be defined as a distance between the third sub-adhesive layer AL2_1 and the fourth sub-adhesive layer AL2_2 in the area overlapping the folding area FA. The third sub-adhesive layer AL2_1 and the fourth sub-adhesive layer AL2_2 may be spaced apart from each other by the first non-attached distance NAD1.

The fifth and sixth sub-adhesive layers AL3_1 and AL3_2 of the third adhesive layer AL3 may not overlap the folding area FA. A second non-attached distance NAD2 may be defined in the third adhesive layer AL3. The second non-attached distance NAD2 may be defined as a length in the first direction DR1 of the space in which the third adhesive layer AL3 is not disposed. For example, the second non-attached distance NAD2 may be defined as a distance between the fifth sub-adhesive layer AL3_1 and the sixth sub-adhesive layer AL3_2 in the area overlapping the folding area FA. The fifth sub-adhesive layer AL3_1 and the sixth sub-adhesive layer AL3_2 may be spaced apart from each other by the second non-attached distance NAD2.

The first non-attached distance NAD1 defined as the length in the first direction DR1 of the space in which the second adhesive layer AL2 is not disposed may be substantially the same as the second non-attached distance NAD2 defined as the length in the first direction DR1 of the space in which the third adhesive layer AL3 is not disposed.

However, the first non-attached distance NAD1 defined as the length in the first direction DR1 of the space in which the second adhesive layer AL2 is not disposed may be different from the second non-attached distance NAD2 defined as the length in the first direction DR1 of the space in which the third adhesive layer AL3 is not disposed.

In the area overlapping the folding area FA, a distance between the first sub-support plate SPT2_1 and the second sub-support plate SPT2_2 may be smaller than a non-attached distance NAD.

Referring to FIGS. 8 and 10, when the digitizer module DTM is folded, the stress may occur in the folded portion of the digitizer module DTM. Due to the stress, the digitizer module DTM may be deformed. For example, the base substrate BF, the upper substrate UF, and the lower substrate LF may be deformed due to the stress caused by the folding operation, and as a result, the first and second electrodes SET1 and SET2 may be cracked.

When the digitizer module DTM is repeatedly folded, the deformation of the digitizer module DTM may be larger.

A strain PI may be defined as a rate at which the digitizer module DTM is deformed from its original length according to reliability evaluation. The strain of the digitizer module DTM may decrease as the non-attached distance NAD increases. The following Table 1 shows the strain of the digitizer module DTM with respect to the non-attached distance NAD. The non-attached distance NAD may include the first and second non-attached distances NAD1 and NAD2. Table 1 shows the test results obtained from the state where the first non-attached distance NAD1 is the same as the second non-attached distance NAD2.

TABLE 1

| Structure | Digitizer module alone | Non-attached distance | | |
|---|---|---|---|---|
| | | 12.65 mm | 80 mm | 110 mm |
| PI strain (room temperature, %) | 1.5 | 1.95 | 1.66 | 1.53 |
| PI strain (low temperature, %) | 1.49 | 2.5 | 1.8 | 1.62 |
| Reliability evaluation result | Pass | Fail | Pass | Pass |

In Table 1, the "room temperature" shows the results obtained when the test is performed at a temperature about 25° C. In Table 1, the "low temperature" shows the results obtained when the test is performed at about −20° C.

In Table 1, the "digitizer module DTM alone" shows the results obtained when the test is performed in a state in which the display module DM and the first and second support plates SPT1 and SPT2 are not disposed on and beneath the digitizer module DTM.

In Table 1, the "non-attached distance NAD" shows the results obtained when the test is performed in a state in which the display module DM and the first and second support plates SPT1 and SPT2 are attached to the digitizer module DTM using the first to third adhesive layers AL1 to AL3.

As shown in Table 1, it is observed that the strain PI of the digitizer module DTM decreases as the non-attached distance NAD increases. As the non-attached distance NAD increases, a difference in strain PI between the digitizer module DTM and the digitizer module DTM alone decreases. The value of the non-attached distance NAD, which passes through the reliability evaluation, may be in a range from about 80 mm to about 130 mm.

The strain PI of the digitizer module DTM may decrease by the third and fourth sub-adhesive layers AL2_1 and AL2_2 of the second adhesive layer AL2, which are spaced apart from each other by the non-attached distance NAD, and the fifth and sixth sub-adhesive layers AL3_1 and AL3_2 of the third adhesive layer AL3, which are spaced apart from each other, by the non-attached distance NAD. As the strain PI of the digitizer module DTM decreases, a possibility of crack occurrence in the digitizer module DTM may be reduced.

Figure 11:
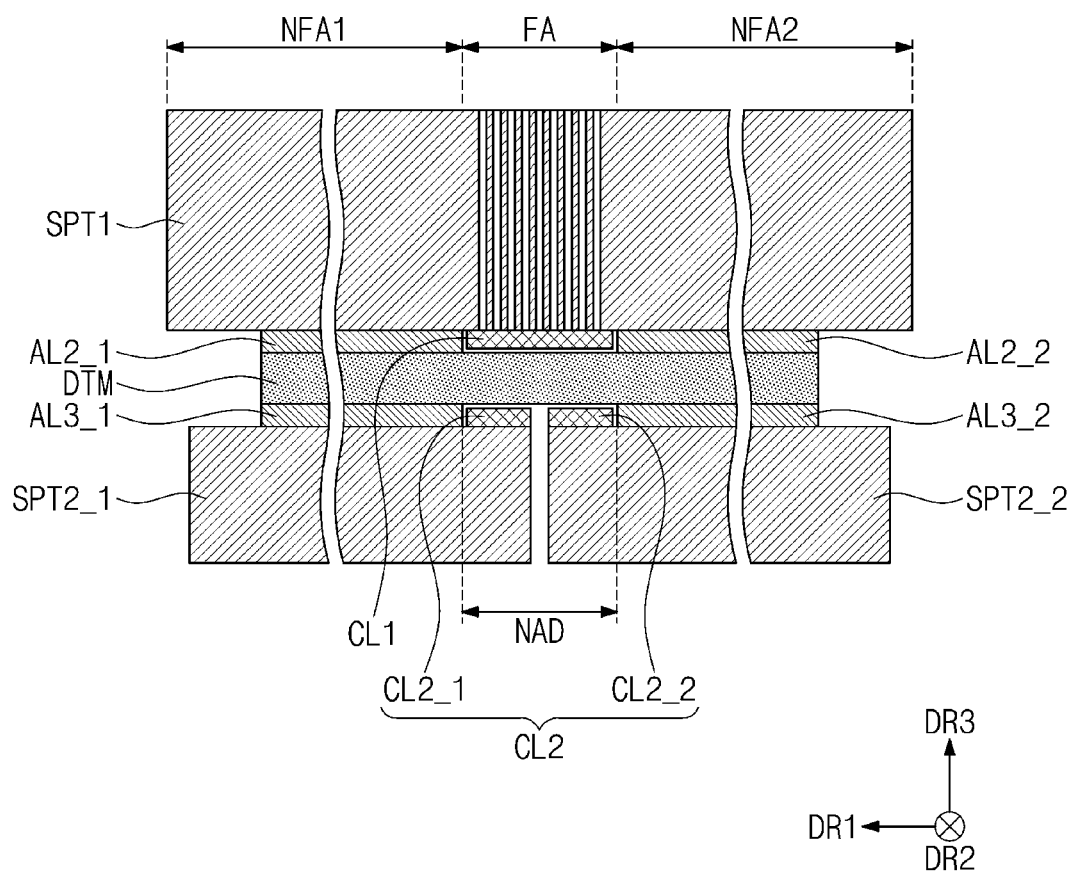
FIG. 11 is a view showing a cushion layer disposed between a digitizer module and an adhesive layer shown in FIG. 10.

FIG. 11 is a view showing a cushion layer that is further disposed in a space defined by the digitizer module DTM and the adhesive layer AL2, AL3 shown in FIG. 10.

Referring to FIG. 11, a first cushion layer CL1 may be disposed between the first support plate SPT1 and the digitizer module DTM. The first cushion layer CL1 may be disposed on a lower surface of the first support plate SPT1. The first cushion layer CL1 may overlap the folding area FA.

A second cushion layer CL2 may be disposed between the digitizer module DTM and the second support plate SPT2. The second cushion layer CL2 may be disposed on an upper surface of the second support plate SPT2. The second cushion layer CL2 may overlap the folding area FA. For example, the first and second cushion layers CL1 and CL2 may be disposed on surfaces of the first and second support plates SPT1 and SPT2, respectively. The first and second cushion layers CL1 and CL2 may not be disposed on the upper and lower surfaces of the digitizer module DTM.

The second cushion layer CL2 may include a first sub-cushion layer CL2_1 and a second sub-cushion layer CL2_2. The first sub-cushion layer CL2_1 may be disposed on the upper surface of the first sub-support plate SPT2_1. The second sub-cushion layer CL2_2 may be disposed on the upper surface of the second sub-support plate SPT2_2.

The first and second cushion layers CL1 and CL2 may include a foam sheet with a predetermined elasticity. The first and second cushion layers CL1 and CL2 may include foam, sponge, polyurethane, or thermal plastic polyurethane. The first and second cushion layers CL1 and CL2 may support the first and second support plates SPT1 and SPT2 and the digitizer module DTM in an empty space of the non-attached distance NAD.

The first and second support plates SPT1 and SPT2 and the digitizer module DTM may be prevented from being lifted to the empty space due to the first and second cushion layers CL1 and CL2.

Figure 12:
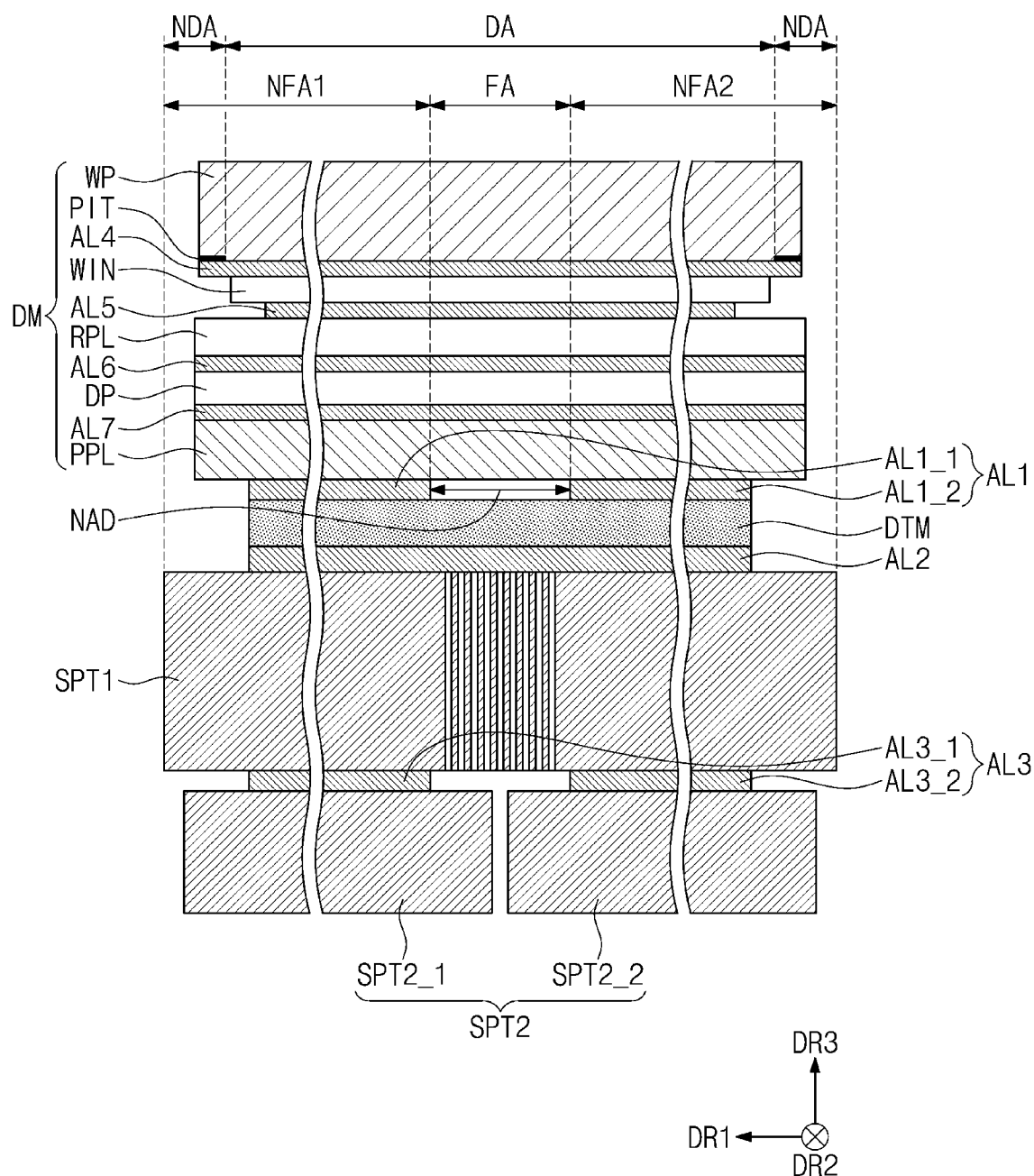
FIG. 12 is a view showing a display device according to another embodiment of the disclosure.

FIG. 12 is a view showing a display device according to another embodiment of the disclosure.

As an example, FIG. 12 shows a cross-section corresponding to the cross-section shown in FIG. 4. Hereinafter, different features from those of FIG. 4 will be described with reference to FIG. 12.

Referring to FIG. 12, a digitizer module DTM may be disposed between a display module DM and a first support plate SPT1. A first adhesive layer AL1 may be disposed between the display module DM and the digitizer module DTM. A first sub-adhesive layer AL1_1 and a second sub-adhesive layer AL1_2 may be disposed to be spaced apart from each other by a non-attached distance NAD. The display module DM and the digitizer module DTM may be attached to each other by the first adhesive layer AL1. A second adhesive layer AL2 may be disposed between the digitizer module DTM and the first support plate SPT1. The digitizer module DTM and the first support plate SPT1 may be attached to each other.

The first sub-adhesive layer AL1_1 and the second sub-adhesive layer AL1_2 may be disposed on the digitizer module DTM and may be spaced apart from each other by the non-attached distance NAD, and thus, the strain of the digitizer module DTM may decrease. Since the strain of the digitizer module DTM decreases, components of the digitizer module DTM may be prevented from being damaged.

Figure 13:
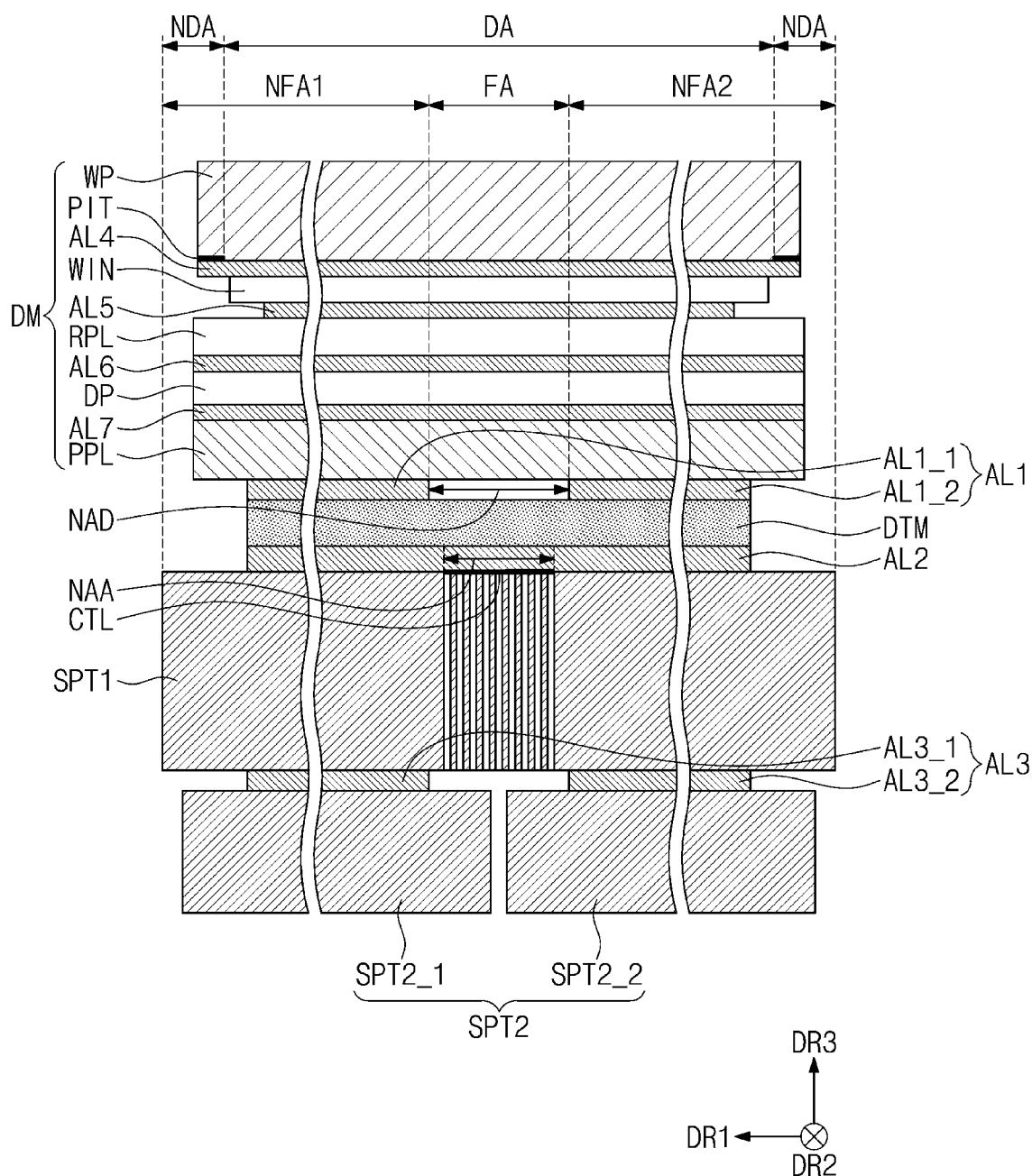
FIG. 13 is a view showing a display device according to another embodiment of the disclosure.

FIG. 13 is a view showing a display device according to another embodiment of the disclosure.

As an example, FIG. 13 shows a cross-section corresponding to the cross-section shown in FIG. 4. Hereinafter, different features from those of FIG. 4 will be described with reference to FIG. 13.

Referring to FIG. 13, a digitizer module DTM may be disposed between a display module DM and a first support plate SPT1. A first sub-adhesive layer AL1_1 and a second sub-adhesive layer AL1_2 may be disposed between the display module DM and the digitizer module DTM. The first sub-adhesive layer AL1_1 and the second sub-adhesive layer AL1_2 may be disposed to be spaced apart from each other by a non-attached distance NAD. The first sub-adhesive layer AL1_1 and the second sub-adhesive layer AL1_2 may be disposed on the digitizer module DTM and may be spaced apart from each other by the non-attached distance NAD, and thus, the strain of the digitizer module DTM may decrease. Since the strain of the digitizer module DTM decreases, components of the digitizer module DTM may be prevented from being damaged.

A second adhesive layer AL2 may be disposed between the digitizer module DTM and the first support plate SPT1.

The second adhesive layer AL2 may have a non-attached area NAA defined on a lower surface thereof overlapping a folding area FA. For example, the non-attached area NAA may be defined in a lower portion of the second adhesive layer AL2 overlapping the folding area FA. A coating layer CTL may be disposed beneath the non-attached area NAA. The coating layer CTL may be coated on an upper surface of the first support plate SPT1 overlapping the folding area FA. The non-attached area NAA of the second adhesive layer AL2 and the first support plate SPT1 overlapping the non-attached area NAA may not be attached to each other by the coating layer CTL. Since the first support plate SPT1 is not attached to the non-attached area NAA when the display device DD is folded, the stress applied to the digitizer module DTM may decrease, and thus, the components of the digitizer module DTM may be prevented from being damaged.

Figure 14:
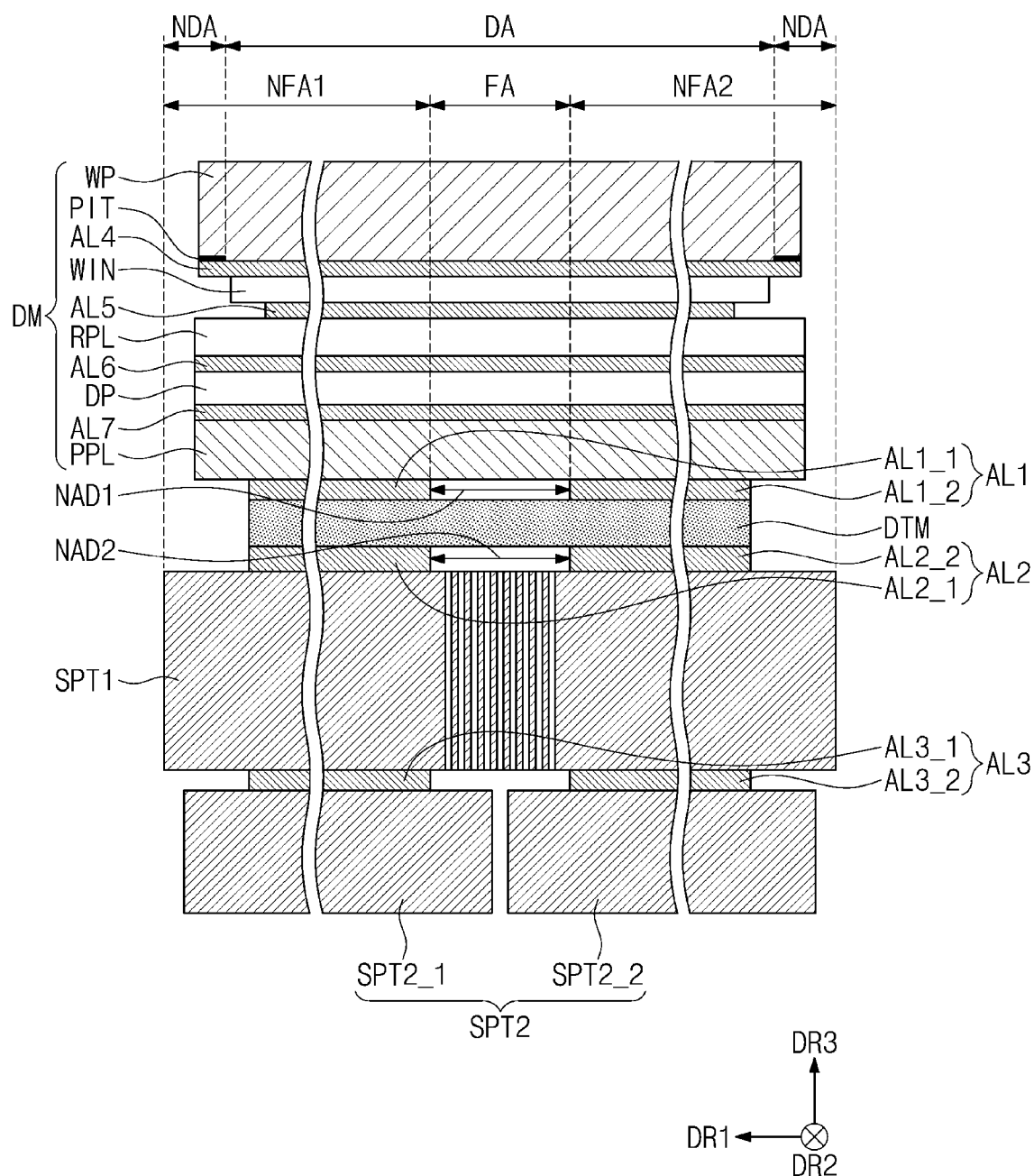
FIG. 14 is a view showing a display device according to another embodiment of the disclosure.

FIG. 14 is a view showing a display device according to another embodiment of the disclosure.

As an example, FIG. 14 shows a cross-section corresponding to the cross-section shown in FIG. 4. Hereinafter, different features from those of FIG. 4 will be described with reference to FIG. 14.

Referring to FIG. 14, a digitizer module DTM may be disposed between a display module DM and a first support plate SPT1. A first sub-adhesive layer AL1_1 and a second sub-adhesive layer AL1_2 may be disposed on an upper surface of the digitizer module DTM and may be spaced apart from each other by a first non-attached distance NAD1. A third sub-adhesive layer AL2_1 and a fourth sub-adhesive layer AL2_2 may be disposed on a lower surface of the digitizer module DTM and may be spaced apart from each other by a second non-attached distance NAD2.

As the first sub-adhesive layer AL1_1 and the second sub-adhesive layer AL1_2 are disposed on the upper surface of the digitizer module DTM to be spaced apart from each other by the first non-attached distance NAD1 and the third sub-adhesive layer AL2_1 and the fourth sub-adhesive layer AL2_2 are disposed on the lower surface of the digitizer module DTM to be spaced apart from each other by the second non-attached distance NAD2, the strain of the digitizer module DTM may decrease. Since the strain of the digitizer module DTM decreases, components of the digitizer module DTM may be prevented from being damaged.

Although the embodiments of the disclosure have been described, it is understood that the disclosure should not be limited to these embodiments but various changes and modifications can be made by one ordinary skilled in the art within the spirit and scope of the disclosure as claimed. Therefore, the disclosed subject matter should not be limited to any single embodiment described herein, and the scope of the inventive concept shall be determined according to the attached claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the disclosure as set forth in the following claims including equivalents thereof.

What is claimed is:

1. A display device comprising:
    a display module comprising a first non-folding area, a second non-folding area, and a folding area disposed between the first non-folding area and the second non-folding area;
    a first support plate disposed beneath the display module and including openings to overlap the folding area in a plan view;
    a second support plate disposed beneath the first support plate and comprising a first sub-support plate and a second sub-support plate respectively overlapping the first non-folding area and the second non-folding area in a plan view;
    a digitizer module disposed between the first support plate and the second support plate, and
    a first cushion layer disposed between the digitizer module and the second support plate and overlapping the folding area in a plan view,
    wherein the first cushion layer comprises:
        a first sub-cushion layer and a second sub-cushion layer disposed between the digitizer module, the first sub-support plate and the second sub-support plate, and
        a first sub-cushion layer and a second sub-cushion layer are spaced apart from each other in a first direction.

2. The display device of claim 1, further comprising a first adhesive layer disposed between the display module and the first support plate.

3. The display device of claim 2, wherein the first adhesive layer does not overlap the folding area in a plan view.

4. The display device of claim 2, further comprising a second adhesive layer disposed between the first support plate and the digitizer module.

5. The display device of claim 4, wherein the second adhesive layer does not overlap the folding area in a plan view.

6. The display device of claim 5, further comprising a third adhesive layer disposed between the digitizer module and the second support plate.

7. The display device of claim 6, wherein the third adhesive layer does not overlap the folding area in a plan view.

8. The display device of claim 7, wherein
    the first non-folding area, the folding area, and the second non-folding area are arranged in a first direction, and
    a first length in the first direction of a space in which the second adhesive layer is not disposed is the same as a second length in the first direction of a space in which the third adhesive layer is not disposed.

9. The display device of claim 8, wherein
    the first sub-support plate and the second sub-support plate are spaced apart from each other beneath the folding area, and
    a distance between the first sub-support plate and the second sub-support plate is smaller than the first length and is smaller than the second length.

10. The display device of claim 8, wherein each of the first length and the second length is in a range from about 80 mm to about 130 mm.

11. The display device of claim 8, wherein the openings extend in a second direction intersecting the first direction.

12. The display device of claim 7, wherein
the first non-folding area, the folding area, and the second non-folding area are arranged in a first direction, and
a first length in the first direction of a space in which the second adhesive layer is not disposed is different from a second length in the first direction of a space in which the third adhesive layer is not disposed.

13. The display device of claim 1, wherein the first support plate has a thickness greater than a thickness of the second support plate.

14. The display device of claim 1, further comprising a second cushion layer disposed between the digitizer module and the first support plate and overlapping the folding area in a plan view.

15. The display device of claim 1, wherein the first cushion layer further comprises:
a second sub-cushion layer disposed between the digitizer module and the second sub-support plate.

16. A display device comprising:
a display module;
a first support plate disposed beneath the display module and including openings;
a second support plate disposed beneath the first support plate and comprising a first sub-support plate and a second sub-support plate spaced apart from the first sub-support plate in an area overlapping the openings in a plan view;
a digitizer module disposed between the first sub-support plate and the second sub-support plate; and
a first cushion layer disposed between the digitizer module and the second support plate and overlapping the folding area in a plan view,
wherein the first cushion layer comprises:
a first sub-cushion layer and a second sub-cushion layer disposed between the digitizer module and the first sub-support plate, and
a first sub-cushion layer and a second sub-cushion layer are spaced apart from each other in a first direction.

17. The display device of claim 16, further comprising:
a first adhesive layer that is disposed between the display module and the first support plate and does not overlap a folding area of the display module, the folding area overlapping the openings in a plan view;
a second adhesive layer that is disposed between the first support plate and the digitizer module and does not overlap the folding area in a plan view; and
a third adhesive layer that is disposed between the digitizer module and the second support plate and does not overlap the folding area in a plan view.

18. The display device of claim 17, further comprising:
a second cushion layer disposed between the digitizer module and the first support plate and overlapping the folding area in a plan view.

\* \* \* \* \*